(12) United States Patent
Graham et al.

(10) Patent No.: US 7,288,282 B2
(45) Date of Patent: Oct. 30, 2007

(54) COATING COMPOSITIONS CONTAINING A FLUORINATED ORGANOSILANE POLYMER

(75) Inventors: William F. Graham, Wilmington, PA (US); Douglas Robert Anton, Wilmington, DE (US); Jeffery W. Johnson, Rochester Hills, MI (US); Michael Joseph Michalczyk, Wilmington, DE (US); Sape Kwesi Quashie, Southfield, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 70 days.

(21) Appl. No.: 10/668,991

(22) Filed: Sep. 22, 2003

(65) Prior Publication Data

US 2005/0065271 A1    Mar. 24, 2005

(51) Int. Cl.
  *B05D 3/00*   (2006.01)
  *B05D 7/26*   (2006.01)

(52) U.S. Cl. .............. 427/142; 427/258; 427/387; 525/199; 525/331.1; 525/330.5; 524/520; 524/589; 524/588; 526/242; 526/279

(58) Field of Classification Search .......... 524/520, 524/589, 588; 525/199, 100, 124, 192, 330.5, 525/331.1; 427/142, 258, 387; 526/242, 526/279

See application file for complete search history.

(56) References Cited

U.S. PATENT DOCUMENTS

| | | | |
|---|---|---|---|
| 4,043,953 A | 8/1977 | Chang et al. | |
| 4,368,297 A | 1/1983 | Kato et al. | |
| 4,518,726 A | 5/1985 | Kato et al. | |
| 4,812,337 A | 3/1989 | Sugimura et al. | |
| 5,162,426 A | 11/1992 | Hazan et al. | |
| 5,290,633 A * | 3/1994 | Devlin et al. | 428/423.1 |
| 5,334,681 A * | 8/1994 | Mueller et al. | 526/243 |
| 5,597,874 A | 1/1997 | Anton et al. | |
| 5,605,956 A | 2/1997 | Anton et al. | |
| 5,627,238 A | 5/1997 | Anton et al. | |
| 5,629,372 A | 5/1997 | Anton et al. | |
| 5,705,276 A | 1/1998 | Anton et al. | |
| 5,914,384 A | 6/1999 | Anton et al. | |
| 5,948,851 A | 9/1999 | Anton et al. | |
| 6,350,526 B1 * | 2/2002 | Johnson et al. | 428/447 |
| 2003/0017349 A1 | 1/2003 | Brown et al. | |
| 2005/0064093 A1* | 3/2005 | Graham et al. | 427/142 |
| 2005/0064202 A1* | 3/2005 | Graham et al. | 428/423.1 |

FOREIGN PATENT DOCUMENTS

| | | |
|---|---|---|
| EP | 0 796 904 A2 | 9/1997 |
| JP | 11100797 A * | 4/1999 |
| JP | 2003129003 A * | 5/2003 |
| WO | WO 03/027198 A1 | 4/2003 |

OTHER PUBLICATIONS

International Search Report (PCT/US2004/031245) dated Dec. 15, 2004.

* cited by examiner

*Primary Examiner*—David W. Wu
*Assistant Examiner*—Satya Sastri
(74) *Attorney, Agent, or Firm*—Kevin S. Dobson

(57) ABSTRACT

A coating composition containing a film-forming organosilane polymer, optionally a non-aqueous dispersed polymer, and a crosslinking agent selected from one or both of an organic polyisocyanate and melamine crosslinker. Fluorine functionalities are incorporated in the organosilane polymer to enhance soil resistance and cleanability. The coating composition can be used as a clearcoat over a conventional pigmented basecoat. The coating composition provides improved soil resistance and cleanability.

11 Claims, No Drawings

COATING COMPOSITIONS CONTAINING A FLUORINATED ORGANOSILANE POLYMER

BACKGROUND OF THE INVENTION

This invention is directed to a coating composition useful for providing a finish on a variety of substrates. In particular, this invention is directed to coatings containing fluorinated organosilane polymers which may be used for finishing the exterior of automobiles and trucks, and which are resistant to soiling and easily cleaned for example by washing with water when soiled.

In order to protect and preserve the aesthetic qualities of the finish on a vehicle, it is generally known to provide a clear (unpigmented or slightly pigmented) topcoat over a colored (pigmented) basecoat, so that the basecoat has an attractive aesthetic appearance, including high gloss and DOI (distinctness of image), and remains unaffected even on prolonged exposure to the environment or weathering. This type of finish is known as a basecoat/topcoat or basecoat/clearcoat finish. It is also generally known that alkoxysilane polymers, due to strong silane bonding when cured, provide finishes with excellent resistance to etching from acid rain and other environmental pollutants, along with good scratch resistance. Exemplary of prior patents disclosing silane polymers for coatings are U.S. Pat. Nos. 4,043,953; 4,518,726 and 4,368,397. Nowadays, these silane coatings are widely used as clearcoats over pigmented basecoats.

However, conventional silane clearcoat finishes still suffer from unsolved problems or deficiencies. In particular, previously disclosed silane coatings have a tendency to soil easily under exterior use conditions. Such soiling not only could seriously and adversely affect long term durability and weatherability of the finish, but also cause the exterior finish of an automobile or truck to lose its luster or other aspects of its attractive aesthetic appearance, including high gloss and excellent DOI, rather quickly in between washings. Given that it is well known that consumers prefer automobiles and trucks with an exterior finish having an attractive aesthetic appearance, rapid soiling of the finish is ever more undesirable.

A number of coatings containing acrylic fluorocarbon polymers have been proposed for use as clearcoats to provide finishes that have high water and oil repellency, stain resistance and good cleanability, for example, as shown in U.S. Pat. Nos. 4,812,337; 5,597,874; 5,605,956; 5,627,238; 5,629,372 and 5,705,276. However, to applicants' knowledge, none of the previously disclosed fluorocarbon finishes employ silane chemistry. Furthermore, there is no suggestion that silane finishes can be made therefrom.

There is a need for a coating composition and in particular an automotive clearcoat that not only is weather- and scratch-resistant, but also that remains relatively dirt free under exterior use conditions and is easily cleaned for example by washing with water when soiled. It is also desirable that such a clearcoat should be capable of being applied using conventional equipment over a variety of basecoats and have excellent adhesion.

SUMMARY OF THE INVENTION

The invention is directed to a coating composition useful for finishing the exterior of automobiles and trucks and other substrates. The coating composition contains about 45-90% by weight of a binder and 10-55% by weight of an organic liquid carrier; wherein the binder contains:

(A) from about 10 to 90% by weight, based on the weight of the binder, of a film-forming fluorinated organosilane polymer having a weight average molecular weight of about 500-30,000 comprising about 5 to 98% by weight, based on the weight of the polymer, of polymerized ethylenically unsaturated monomers which do not contain a silane or a fluorine functionality, about 1.5 to 70% by weight, based on the weight of the polymer, of ethylenically unsaturated monomers which contain a silane functionality, and about 0.5-25% by weight, based on the weight of the polymer, of polymerized ethylenically unsaturated monomers which contain a fluorine functionality, (B) from about 0 to 60%, based on the weight of the binder, of a non-aqueous dispersed polymer, and (C) from about 10-90% by weight, based on the weight of the binder, of a crosslinking agent selected from one or both of an organic polyisocyanate and alkylated melamine crosslinking agent.

Optionally, the composition may further comprise one or more non-silane-containing film-forming solution polymers, preferably 0 to 30%, more preferably about 0 to 20% by weight, based on the weight of binder solids in the composition.

This invention is also directed to a process for coating a substrate with the above coating composition and a substrate such as a vehicle body or a part thereof having adhered thereto a coating according to the above composition.

The composition of the present invention is especially useful for forming a clear topcoat over a pigmented basecoat. Such a clear topcoat can be applied over a variety of basecoats, such as water or organic solvent based basecoats or powder basecoats.

DETAILED DESCRIPTION OF THE INVENTION

This invention provides a coating composition useful for finishing the exterior of automobile and truck bodies.

The coating composition of this invention primarily is used as a clearcoat over a pigmented colorcoat or basecoat containing solid color pigments or metallic flake or other effect pigments or mixtures thereof. The coating composition also can be used as a conventional pigmented composition. The coating composition can be applied with conventional spray equipment and cured at ambient temperatures or slightly elevated temperatures to decrease drying time. The resulting finish has excellent gloss and distinctness of image and weatherability. The resulting finish also offers a significant improvement over conventionally used automotive finishes in terms of dirt and soil resistance and cleanability.

Preferably, the coating composition is a clear coating composition, i.e. containing no pigments or a small amount of transparent pigment. The composition has a relatively high solids content of about 45-90% by weight of binder and about 10-55% by weight of an organic carrier which can be a solvent for the binder or a mixture of solvents. Preferably, the coating composition is a high solids composition that contains about 50-80% by weight of the binder and 20-50% by weight of the organic solvent carrier. The coating of the present invention is also preferably a low VOC (volatile organic content) coating composition, which means a coating that includes less than 0.6 kilograms of organic solvent per liter (5 pounds per gallon) of the composition as determined under the procedure provided in ASTM D3960.

As indicated above, the film-forming portion of the present coating composition, comprising polymeric components, is referred to as the "binder" or "binder solids" and is dissolved, emulsified or otherwise dispersed in an organic solvent or liquid carrier. The binder generally includes all the normally solid polymeric non-liquid components of the composition. Generally, catalysts, pigments, or chemical additives such as stabilizers are not considered part of the binder solids. Non-binder solids other than pigments usually do not amount to more than about 10% by weight of the composition. In this disclosure, the term binder or binder solids includes the fluorinated silane polymer, the dispersed polymer, crosslinking agents, and all other optional film-forming polymers.

The binder used in the coating composition of the present invention is a blend of materials which contains as the main component about 10-90% by weight, preferably 40-80%, of a film-forming fluorinated organosilane containing polymer, hereafter also referred to as the fluorinated silane polymer.

The fluorinated silane polymer used in the coating has a weight average molecular weight of about 500-30,000, preferably about 3,000-10,000. All molecular weights disclosed herein are determined by GPC (gel permeation chromatography) using a polystyrene standard.

In a preferred embodiment, the fluorinated silane polymer is the polymerization product of a mixture of monomers of which about 1.5-70%, preferably 5-50%, by weight are ethylenically unsaturated monomers which contain a silane functionality, about 5-98%, preferably about 40-95%, by weight are ethylenically unsaturated non-silane and non-fluorine containing monomers, and about 0.5-25%, preferably about 1.0-10%, by weight are ethylenically unsaturated monomers which contain a fluorine functionality. An acrylosilane resin having 8% by weight silane monomer and 1.5% fluoroalkyl monomer has been found to have good acid etch resistance, mar resistance, and cleanability.

Suitable ethylenically unsaturated monomers that contain neither silane nor fluorine functionality are alkyl acrylates, alkyl methacrylates and any mixtures thereof, where the alkyl groups have 1-12 carbon atoms, preferably 2-8 carbon atoms. Suitable alkyl methacrylate monomers used to form the organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohlexyl methacrylate, trimethylcyclohexl acrylate, isobornyl methacrylate, isobornyl acrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-fluorine and non-silane containing polymerizable monomers, up to about 50% by weight of the polymer, can be used in the acrylosilane polymer for the purpose of achieving the desired properties such as hardness, appearance, and the like. Exemplary of such other monomers are styrene, methyl styrene, acrylamide, acrylonitrile, methacrylonitrile, and the like. Hydroxy functional monomers can also, and preferably are, incorporated into the fluorinated silane polymer to produce a polymer having a hydroxy number of 20 to 160. Suitable hydroxy functional monomers are hydroxy alkyl (meth)acrylates meaning hydroxy alkyl acrylates and hydroxy alkyl methacrylates having 1-4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like. The presence of hydroxy functional monomers enables additional crosslinking to occur between the hydroxy groups and silane moieties on the silane polymer and/or between the hydroxy groups with other crosslinking groups on binder components that may be present in the top coat composition.

Suitable silane containing monomers useful in forming the fluorinated silane polymer are alkoxy silanes having the following structural formula:

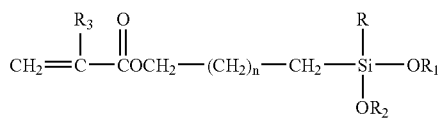

where R is either $CH_3$, $CH_3CH_2$, $CH_3O$, or $CH_3CH_2O$; $R_1$ and $R_2$ are independently $CH_3$ or $CH_3CH_2$; and $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyl trimethoxysilane and the methacrylatoalkoxy silanes, such as gamma-methacryloxypropyl trimethoxysilane, and gamma-methacryloxypropyltris(2-methoxyethoxy) silane.

Other suitable alkoxy silane monomers have the following structural formula:

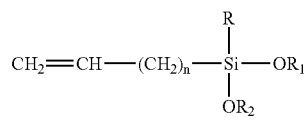

where R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are ethylenically unsaturated acryloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

Silane functional macromonomers also can be used in forming the fluorinated silane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1-4 carbon atoms in the alkyl group and an isocyanatoalkyl alkoxysilane such as isocyanatopropyl triethoxysilane.

Typical of such above-mentioned silane functional macromonomers are those having the following structural formula:

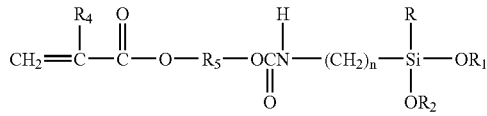

where R, $R_1$, and $R_2$ are as described above; $R_4$ is H or $CH_3$, $R_5$ is an alkylene group having 1-8 carbon atoms and n is a positive integer from 1-8.

The fluorine containing monomers are preferably used in amounts of about 0.5-10% by weight, based on the total weight of the fluorinated silane polymer. Since fluorocarbon monomers are expensive, the present composition preferably has a low content of fluorocarbon constituents. Useful fluorine containing monomers are fluoroalkyl monomers represented by the formula

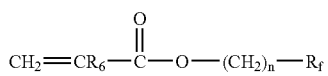

where $R_6$ is hydrogen or an alkyl group having 1-2 carbon atoms, n is an integer of 1-18 and $R_f$ is a fluoroalkyl containing group having at least 4 carbon atoms and preferably a straight chain or branched chain fluoroalkyl group having 4-20 carbon atoms which optionally can contain an oxygen atom.

Typical useful fluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, and the like. Preferred are perfluoro alkyl ethyl methacrylates wherein the fluoroalkyl group contains 4-20 carbon atoms.

Other useful fluoroalkyl containing monomers are represented by the formula

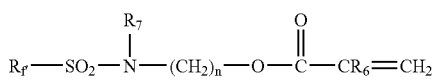

where $R_6$ is as defined above, $R_f$ is a fluoroalkyl group having 4-12 carbon atoms, $R_7$ is an alkyl group having 1-4 carbon atoms and n is an integer of 1-4.

Typical of these monomers are the following:

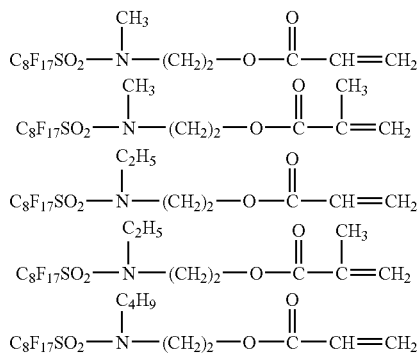

Consistent with the above mentioned components, an example of a fluorinated acrylosilane polymer useful in the top coat composition of this invention may contain the following constituents: about 10-30% by weight styrene, about 2-20% by weight gamma-methacryloxypropyl trimethoxysilane, and about 10-30% by weight isobutyl methacrylate, 5-30% by weight 2-ethyl hexyl acrylate, 15-45% by weight hydroxy ethyl methacrylate and about 0.5-5% by weight fluoroalkyl ethyl methacrylate having 4-20 atoms in the alkyl group.

One particularly preferred fluorinated acrylosilane polymer contains about 20% by weight styrene, about 8% by weight gamma-methacryloxypropyl trimethoxysilane, about 70.5% by weight of nonfunctional acrylates or methacrylates such as trimethylcyclohexyl methacrylate, butyl acrylate, and iso-butyl methacrylate and any mixtures thereof, and about 1.5% by weight of the above fluoroalkyl ethyl methacrylate monomer.

The fluorinated silane polymer used in the coating composition is preferably prepared by conventional polymerization techniques in which the monomers, solvent, and polymerization initiator are charged over a 1-24 hour period of time, preferably in a 2-8 hour time period, into a conventional polymerization reactor in which the constituents are heated to about 60-175° C., preferably about 110-170° C.

In a preferred process for forming the fluorinated silane polymer, the fluoroalkyl containing monomers are not added over an extended period of time with the other monomers but at any time during the polymerization process such as the beginning, end or middle. The polymerizable fluoroalkyl containing monomers usually are blended with solvent and then added to the reactor. The fluoroalkyl containing monomers are added in about 0.01-10% of the total time of polymerization of the polymer. Preferably, the fluoroalkyl containing monomers are added after at least some of the other monomers have been added and polymerized to some extent.

The addition of the fluoroalkyl containing monomers in the above manner, typically as a shot towards the end of the polymerization reaction, is a way of making a certain percentage of the polymer chains high in fluorine content without using large amounts of expensive fluorine monomers. This allows one to achieve high cleanability while offering substantial cost savings. It is also beneficial to add a portion of the other functional monomers, for instance, the silane containing—and hydroxyl containing—monomers, typically as a shot towards the end of the polymerization reaction, to provide chains not only rich in fluorine content, but also rich in other functional groups, such as the crosslinkable groups, to achieve other desired film properties, such as high scratch and mar resistance and excellent adhesion to windshield sealants. This technique is also a way of increasing the lifetime of the fluorine surface, since it allows at least a portion of the fluorine groups to become crosslinked through the other functional groups into the final film network, which prevents the fluorine groups from slowly washing away and ultimately disappearing from the surface of the coating film.

In an alternate embodiment, higher amounts of the fluoroalkyl containing monomers (above 25% by weight) are added with the other monomers to produce a fluorine-rich silane polymer. The resultant fluorinated silane polymer may have a high level of fluoro-functionality, and may be effective as a "mix-in" polymer or additive (typically in the amount from about 0.1-10% by weight, based on the weight of the binder) to any commercially available coating system.

Typical polymerization initiators that are used in the process are azo type initiators such as azo-bis-isobutyronitrile, 1,1'-azo-bis(cyanocyclohexane), peroxy acetates such as t-butyl peracetate, peroxides such as di-t-butyl peroxide, benzoates such as t-butyl perbenzoate, octoates such as t-butyl peroctoate and the like.

Typical solvents that can be used in the process are alcohols such as methanol, ethanol, n-butanol, n-propanol, and isopropanol, ketones such as methyl amyl ketone, methyl isobutyl ketone, methyl ethyl ketone, aromatic hydrocarbons such as toluene, xylene, Solvesso® 100, alkylene carbonates such as propylene carbonate, n-methyl pyrrolidone, ethers, esters, acetates and mixture of any of the above.

Additional to the fluorinated silane polymer, other film-forming and/or crosslinking solution polymers may be included in the present application. Examples include conventionally known acrylosilanes, acrylics, cellulosics, aminoplasts, isocyanates, urethanes, polyesters, epoxies or mixtures thereof. One preferred optional film-forming polymer is a polyol, for example an acrylic polyol solution polymer of polymerized monomers. Such monomers may include any of the aforementioned alkyl acrylates and/or methacrylates and in addition, hydroxy alkyl acrylates and/or methacrylates. Suitable alkyl acrylates and methacrylates have 1-12 carbon atoms in the alkyl groups. The polyol polymer preferably has a hydroxyl number of about 50-200 and a weight average molecular weight of about 1,000-200,000 and preferably about 1,000-20,000.

To provide the hydroxy functionality in the polyol, up to about 90% preferably 20 to 50%, by weight of the polyol comprises hydroxy functional polymerized monomers. Suitable monomers include hydroxy alkyl acrylates and methacrylates, for example, such as the hydroxy alkyl acrylates and methacrylates listed hereinabove and mixtures thereof.

Other polymerizable non-hydroxy-containing monomers may be included in the polyol polymer component, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10-20% by weight of styrene, 40-60% by weight of alkyl methacrylate or acrylate having 1-6 carbon atoms in the alkyl group, and 10-50% by weight of hydroxy alkyl acrylate or methacrylate having 1-4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

In addition to the above polymeric components, a dispersed polymer may be, and preferably is, used in combination with the fluorinated silane polymer. Polymers dispersed in an organic (substantially non-aqueous) medium have been variously referred to, in the art, as a non-aqueous dispersion (NAD) polymer, non-aqueous polymer microparticle dispersion, a non-aqueous latex, or a polymer colloid. See generally, Barrett, DISPERSION POLYMERIZATION IN ORGANIC MEDIA (John Wiley 1975). See also U.S. Pat. Nos. 4,147,688; 4,180,489; 4,075,141; 4,415,681; and 4,591,533, hereby incorporated by reference. In general, a dispersed polymer is characterized as a polymer particle dispersed in an organic media, which particle is stabilized by steric stabilization accomplished by the attachment of a solvated polymeric or oligomeric layer at the particle-medium interface.

In the dispersed polymers of this composition, the dispersed phase or particle, sheathed by a steric barrier, is referred to as the "core." The stabilizer forming the steric barrier, attached to this core, will be referred to as the "macromonomer chains" or "arms."

The dispersed polymers used in the present invention to solve the problem of cracking heretofore associated with silane coatings. These dispersed polymers, to reduce cracking to the desired minimum, must be used in relatively higher amounts than when typically used for other purposes such as for flow control agents. The present dispersed polymers are typically used in an amount varying from 0 to 60% by weight, preferably about 4 to 40%, more preferably 5 to 30% of the total binder in the composition. The ratio of silane compound to the dispersed polymer component in the composition suitably ranges from 5:1 to 1:2, preferably 4:1 to 1:1. This relatively high concentration of dispersed polymer in the composition is made possible by the presence of reactive groups in the arms of the dispersed polymer, which reactive groups make the polymers compatible with the continuous phase of the system.

The dispersed polymer contains about 10-90% by weight, preferably 50-80%, based on the weight of the dispersed polymer, of a high molecular weight core having a weight average molecular weight of about 50,000-500,000. The preferred average particle size is 0.1 to 0.5 microns. The arms, attached to the core, make up about 90-10% by weight, preferably 20-50%, of the dispersed polymer, and have a weight average molecular weight of about 1,000-30,000, preferably 1000-10,000.

Preferably, the core of the dispersed polymer is comprised of polymerized ethylenically unsaturated monomers. Suitable monomers include styrene, alkyl acrylate or methacrylate, ethylenically unsaturated monocarboxylic acid, and/or silane containing monomers. Other optional monomers are hydroxyalkyl acrylates or methacrylates or acrylonitrile. It is noted that such functional groups as hydroxy can react with silane groups in the fluorinated acrylosilane polymer to produce more bonding in the composition. If a crosslinked core is desired, allyl acrylate or allyl methacrylate, which crosslink with each other, can be used or an epoxy functional monomer such as glycidyl acrylate or methacrylate can be used, which can react with a monocarboxylic acid functional ethylenically unsaturated monomer to crosslink the core.

Or the core can contain silane functionality, for crosslinking purposes, which functionality may be provided by a small amount of one or more of the silane containing monomers mentioned above with respect to the film forming fluorinated acrylosilane polymer.

A desired feature of the dispersed polymers used in this invention is the presence of macromonomer arms which are reactive, that is these arms have numerous reactive groups, referred to a "crosslinking functionalities," which are adapted to react with the fluorinated silane polymer of the present composition. It is not known with certainty what portion of the these functional groups do, in fact, react with the fluorinated silane polymer, because of the numerous and complicated sets of reactions which may occur during baking and curing of the composition, especially if additional film-forming binders are present. However, it may be said that a substantial portion of these functionalities in the arms, preferably the majority thereof, do in actuality react and crosslink with the film-former of the composition. If additional film-forming polymers are present, for example, a polyol, then the arms may react with film forming polymers other than the fluorinated silane polymer. Suitably, about 3 to 30% of the monomers which make up the macromonomer arms have reactive crosslinking functional groups. Preferably about 10 to 20% of the monomers have such reactive groups.

The arms of dispersed polymer should be anchored securely to the macromolecular core. For this reason, the arms preferably are anchored by covalent bonds. The anchoring must be sufficient to hold the arms to the dispersed polymer after they react with the film-former polymer.

As indicated above, the arms or macromonomers of the dispersed polymer serve to prevent the core from flocculating by forming what is referred to in the art as a steric barrier. The arms, typically in contrast to the core, are capable, at least temporarily, of being solvated in the organic solvent carrier or media of the composition. They may therefore be in a chain-extended configuration and their crosslinking functional groups are therefore relatively readily available to reaction with the silane groups of the film forming silane containing polymer. Such arms suitably comprise about 5 to 30% by weight, preferably 10 to 20%, based on the weight of macromonomer, of polymerized ethylenically unsaturated hydroxy, epoxide, silane, acid, anhydride, isocyanate, amide, or other crosslinking functionality containing monomers, or combinations thereof, and about 70-95% by weight, based on the weight of the macromonomer, of at least one other polymerized ethylenically unsaturated monomer without such crosslinking functionality. Preferably the crosslinking functionality is a hydroxy, silane or epoxy containing monomer, since such reactive groups can be utilized in one package systems. When the crosslinking functionality is an acid, anhydride, or isocyanate, then a two package system, with the dispersed polymer in a first package and the fluorinated silane in a second package, is generally required. Combinations of the above-mentioned crosslinking functional groups are also suitable, although it is noted that hydroxy and silane groups have limited compatibility and are preferably not on the same macromonomer chain.

The macromonomer arms attached to the core may contain polymerized monomers of alkyl methacrylate, alkyl acrylate, each having 1-12 carbon atoms in the alkyl group, as well as glycidyl acrylate or glycidyl methacrylate or ethylenically unsaturated monocarboxylic acid containing monomers for anchoring and/or crosslinking. Typically useful hydroxy containing monomers are hydroxy alkyl acrylates or methacrylates as described above.

A preferred composition for the dispersed polymer that has hydroxy functionality comprises a core consisting of about 25% by weight hydroxy ethyl acrylate, about 4% by weight methacrylic acid, about 46.5% by weight methyl methacrylate, about 18% by weight methyl acrylate, about 1.5% by weight glycidyl methacrylate and about 5% styrene. The macromonomer attached to the core contains 97.3% by weight prepolymer and about 2.7% by weight glycidyl methacrylate, the latter for crosslinking or anchoring. A preferred prepolymer contains about 28% by weight butyl methacrylate, about 15% by weight ethyl methacrylate, about 30% by weight butyl acrylate, about 10% by weight hydroxyethyl acrylate, about 2% by weight acrylic acid, and about 15% by weight styrene.

The dispersed polymer may be produced by conventionally known procedures. For example, it has been disclosed that such polymers may be produced by a process of dispersion free radical polymerization of monomers, in an organic solvent, in the presence of a steric stabilizer for the particles. The procedure has been described as basically one of polymerizing the monomers in an inert solvent in which the monomers are soluble but the resulting polymer is not soluble, in the presence of a dissolved amphiteric stabilizing agent. Such procedures have been extensively disclosed in both the patent and non-patent literature, for example, see the above-cited references regarding dispersed polymers in general, or U.S. Pat. No. 4,220,679 and PAINT AND SURFACE COATING: THEORY AND PRACTICE, ed. R. Lambourne (Ellis Horwood Limited 1987). The macromonomer arms can be prepared by cobalt catalyzed special chain transfer (SCT) polymerization, group, transfer polymerization (GTP), or free radical polymerization. The dispersed polymer solves the problem of cracking heretofore associated with silane coatings.

Suitable dispersed polymers for use herein are also disclosed in U.S. Pat. No. 5,162,426, hereby incorporated by reference. Preferably, about 20% by weight of such a dispersed polymer is included to prevent cracking.

For a two-component or two-pack system, which is generally preferred, a polyfunctional organic isocyanate can be used as the crosslinking agent without particular limitation so long as the isocyanate compound has at least two isocyanate groups in the one molecule. The preferable polyisocyanate compounds are isocyanate compounds having 2 to 3 isocyanate groups per molecule. Typical examples of polyfunctional organic isocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Trimers of diisocyanates also can be used such as the trimer of hexamethylene diisocyanate (isocyanurate) which is sold under the tradename Desmodur® N-3390, the trimer of isophorone diisocyanate (isocyanurate) which is sold under the tradename Desmodur® Z-4470 and the like. Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimtheylol propane and is sold under the tradename of Cythane® 3160. When the crosslinkable resin of the present invention is used in exterior coatings, the use of an aliphatic or cycloaliphatic isocyanate is preferable to the use of an aromatic isocyanate, from the viewpoint of weatherability and yellowing resistance.

Optionally, the present coating composition may further include, particularly in conjunction with optional polyol polymer or other hydroxy functional polymer, an additional crosslinking agent, for example, an aminoplast crosslinking agent. Particularly preferred aminoplast resins are any of the conventionally used alkylated melamine formaldehyde crosslinking agents. Typically useful alkylated melamine formaldehyde crosslinking agents are, for example, conventional monomeric or polymeric alkylated melamine formaldehyde resin that are partially or fully alkylated. One useful crosslinking agent is a methylated and butylated or isobutylated melamine formaldehyde resin that has a degree of polymerization of about 1-3. Generally, this melamine formaldehyde resin contains about 50% butylated groups or isobutylated groups and 50% methylated groups. Such crosslinking agents typically have a number average molecular weight of about 300-600 and a weight average molecular weight of about 500-1500. Examples of commercially available resins are Cymel® 1168, Cymel® 1161, Cymel® 1158, Resimine® 4514 and Resimine® 354. Preferably, the crosslinking agent is used in the amount of about 5-50% by weight, based on the weight of the binder. Other contemplated crosslinking agents are urea formaldehyde, benzoquanamine formaldehyde and blocked polyisocyanates or compatible mixtures of any of the forgoing crosslinkers. Preferably about 10-60% by weight of such crosslinking agent in included in the binder of the coating.

The clear coat composition described above can also be formulated (minus the unblocked organic polyisocyanate) as a one-package system that has extended shelf life.

A catalyst is typically added to catalyze the crosslinking of the silane moieties of the silane polymer with itself and/or with other components of the composition. A wide variety of catalysts can be used, such as dibutyl tin dilaurate, dibutyl tin dilaurate, dibutyl tin diacetate, dibutyl tin dioxide, dibutyl tin dioctoate, tin octoate, aluminum titanate, aluminum chelates, zirconium chelate and the like. Sulfonic acids, such as dodecylbenzene sulfonic acid, either blocked or unblocked, are effective catalysts. Alkyl acid phosphates, such as phenyl acid phosphate, either blocked or unblocked, may also be employed. Any mixture of the aforementioned catalysts may be useful, as well. Other useful catalysts will readily occur to one skilled in the art. Preferably, the catalysts are used in the amount of about 0.1 to 5.0%, based on the weight of the binder.

To improve the weatherability of the clear finish made with the topcoat composition, an ultraviolet light stabilizer or a combination of ultraviolet light stabilizers can be added to the topcoat composition in the amount of about 0.1-10% by weight, based on the weight of the binder. Such stabilizers include ultraviolet light absorbers, screeners, quenchers, and specific hindered amine light stabilizers. Also, an antioxidant can be added, in the about 0.1-5% by weight, based on the weight of the binder. Typical ultraviolet light stabilizers that are useful include benzophenones, triazoles, triazines, benzoates, hindered amines and mixtures thereof.

A suitable amount of water scavenger such as trimethyl orthoacetate, triethyl orthoformate, tetrasilicate and the like (preferably 2 to 6% by weight of binder) is typically added to the topcoat composition for extending its pot life. About 3% microgel (preferably acrylic) and 1% hydrophobic silica may be employed for rheology control. The composition may also include other conventional formulation additives such as flow control agents, for example, such as Resiflow® S (polybutylacrylate), BYK® 320 and 325 (high molecular weight polyacrylates).

When the present composition is used as a clearcoat (topcoat) over a pigmented colorcoat (basecoat) to provide a basecoat/clearcoat finish, small amounts of pigment can be added to the clear coat to eliminate undesirable color in the finish such as yellowing.

The present composition also can be pigmented and used as the colorcoat, or as a monocoat or even as a primer or primer surfacer. When used as a monocoat, these compositions are especially useful for aviation, farm and construction equipment, and architectural coatings where improved cleanabilty is desired. It can also be used as a monocoat to paint or coat parts and devices where lubricity is desired. All of these pigmented compositions have excellent adhesion to a variety of substrates, such as previously painted substrates, cold rolled steel, phosphatized steel, and steel coated with conventional primers by electrodeposition. The present composition also exhibits excellent adhesion to primers, for example, those that comprise crosslinked epoxy polyester and various epoxy resins, as well as alkyd resin repair primers. The present composition can be used to coat plastic substrates such as polyester reinforced fiberglass, reaction injection-molded urethanes and partially crystalline polyamides.

When the present coating composition is used as a basecoat, monocoat, primer or primer surfacer, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and other effect pigments such as pearlescent, i.e., mica, flakes, and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

Conventional solvents and diluents are used to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

The coating composition can be applied by conventional techniques such as spraying, electrostatic spraying, dipping, brushing, flowcoating and the like. The preferred techniques are spraying and electrostatic spraying. After application, the composition is typically baked at 100-150° C. for about 15-30 minutes to form a coating about 0.1-3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

Upon curing of clear topcoat compositions of the present invention a portion of the fluorinated silane-containing polymer may preferentially migrate to, and stratify within, the top portion of the clearcoat, particularly when the fluorinated organosilane polymer is used in combination with a polyol, so as to produce a durable, weather-resistant clearcoat. Such stratification is also generally desirable, since it contributes to very low surface energy, high water and oil repellency, and hence outstanding stain resistance and cleanability, by virtue of the presence of the fluorocarbon constituents. Such stratification has been shown by electron scanning chemical analysis (ESCA) of a cross section of the cured layer of topcoat.

The coating compositions of this invention when applied to a substrate and fully cured most desirably have a water advancing contact angle at least 100°, preferably 100°-120° and a hexadecane advancing angle of at least 40°, preferably 45-85° and more preferably 60°-85°, which provides for a finish, as discussed above, that remains relatively dirt free and easily washed or wiped clean. The relationship between water and organic liquid contact angles and cleanability and dirt retention is more fully described below in the Examples.

EXAMPLES

The following Examples illustrate the invention. All parts and percentages are on a weight basis unless otherwise indicated. All molecular weights disclosed herein are determined by GPC using a polystyrene standard.

The following polymers were prepared and used as indicated in Examples 1 and Comparative Example 2.

Preparation of Fluorinated Acrylosilane Polymer

A fluorinated hydroxy-functional acrylosilane polymer was prepared by charging the following constituents into a nitrogen blanketed reaction equipped as above:

| Ingredients | Parts by Weight (grams) |
|---|---|
| Portion I | |
| Aromatic solvent (Solvesso ® 100 from Exxon) | 1049.8 |
| n-Butanol | 524.9 |
| Portion II | |
| Styrene | 923.8 |
| 2-Ethylhexyl acrylate | 706.7 |
| Hydroxyethyl methacrylate | 1478.1 |
| Isobutyl methacrylate | 1071.6 |
| Gamma-methacryloxypropyl trimethoxysilane (Silquest ® A-174 from Crompton) | 231.0 |
| 2,2'-azobis(2-methylbutyronitrile) (Vazo ® 67 from DuPont) | 332.6 |
| Aromatic solvent (Solvesso ® 100 from Exxon) | 1417.2 |
| n-Butanol | 182.7 |
| Portion III | |
| 1,1,2,2 Perfluoroalkyl ethyl methacrylate (Zonyl TM ® from DuPont; mixed perfluoroalkylethylacrylates of formula $F(CF_2CF_2)_{3-8}CH_2CH_2OC(O)CH=CH_2$) | 69.3 |
| 2,2'-azobis(2-methylbutyronitrile) (Vazo ® 67 from DuPont) | 32.3 |
| Gamma-methacryloxypropyl trimethoxysilane (Silquest ® A-174 from Crompton) | 138.6 |
| Aromatic solvent (Solvesso ® 100 from Exxon) | 69.3 |
| Portion IV | |
| 2,2'-azobis(2-methylbutyronitrile) (Vazo ® 67 from DuPont) | 36.9 |
| Aromatic solvent (Solvesso ® 100 from Exxon) | 210.0 |
| n-Butanol | 105.0 |
| Total | 8579.8 |

Portion I was charged into the reaction flask and heated to its reflux temperature under agitation. Portion II was premixed and then added thereto over a 240 minute period while maintaining the reaction mixture at the reflux temperature. Portion III was premixed and then added at one time to the reaction mixture 230 minutes after the start of the addition of Portion II. After completion of the 240 minute feed, Portion IV that had been premixed was added over a 30 minute period and then the reaction mixture was held at its reflux for an additional 60 minutes. The resulting polymer solution was then cooled to room temperature.

The resulting polymer solution had a weight solids of 56.9%, Gardner-Holdt viscosity measured at 25° C. of J, a number average molecular weight of about 2,565 and a polydispersity of 1.6, and contains the following constituents Sty/2-EHA/iBMA/A-174/HEMA//Zonyl TM® (shot)/A-174(shot) in a weight ratio of 20/15/23.5/5/32//1.5/3.

Preparation of Non-Fluorinated Acrylosilane Resin

For comparative purposes, a non-fluorinated hydroxy functional acrylosilane resin was prepared by charging the following to a nitrogen blanketed flask equipped as above:

| | Parts by Weight |
|---|---|
| Portion I | |
| Aromatic solvent (Solvesso ® 100 from Exxon) | 96.8 |
| n-Butanol | 44.9 |
| Portion II | |
| Styrene | 98.9 |
| Hydroxyethyl methacrylate | 155.8 |
| Isobutyl methacrylate | 128.1 |
| 2-Ethyl hexyl acrylate | 62.3 |
| gamma-Methacryloxypropyl trimethoxysilane (Silquest ® A-174 from Crompton Corp.) | 49.5 |
| Aromatic solvent (Solvesso ® 100 from Exxon) | 18.3 |
| Portion III | |
| Aromatic solvent (Solvesso ® 100 from Exxon) | 64.3 |
| n-Butanol | 68.8 |
| 2,2'-azobis(2-methylbutyronitrile) (Vazo ® 67 from DuPont) | 42.0 |
| Total | 829.7 |

Portion I was charged into the reaction flask and heated to reflux temperature under agitation and a nitrogen blanket. Portions II and III were separately premixed and added to Portion I over a 270 minute period, while the solution was maintained at reflux temperature. The resulting polymer solution was then held at reflux temperature for 30 minutes.

The resulting polymer solution has a 64% solids content, a T viscosity as measured on a Gardner-Holtz scale, and a weight average molecular weight of about 5,000.

Preparation of Acrylic Polyol Resin

An acrylic polyol resin, which may optionally be included in the composition of the present invention, was prepared by charging the following to a nitrogen blanketed flask equipped as above:

|  | Parts by Weight |
| --- | --- |
| Portion I | |
| Aromatic solvent (Solvesso ® 100 from Exxon) | 164.5 |
| n-Butyl Acetate | 18.8 |
| Portion II | |
| Hydroxy ethyl acrylate | 174.0 |
| Butyl methacrylate | 233.8 |
| Styrene | 136.0 |
| Aromatic solvent (Solvesso ® 100 from Exxon) | 27.4 |
| n-Butyl Acetate | 3.0 |
| Portion III | |
| 2,2'-azobis(2-methylbutyronitrile) (Vazo ® 67 from DuPont) | 21.7 |
| Aromatic solvent (Solvesso ® 100 from Exxon) | 63.6 |
| n-Butyl Acetate | 12.1 |
| Total | 854.9 |

Portion I was charged into the reactor and heated to reflux temperature. Portions II and III were premixed separately and then added simultaneously to the reactor while the reaction mixture was held at reflux temperature, over a 260 minute period. The solution was then held at reflux temperature for 30 minutes.

The resulting acrylic polyol resin is 66% by weight solids, and has a weight average molecular weight of about 6,000.

Preparation of Acrylic NAD Resin

A hydroxy functional acrylic NAD resin, which may optionally be included in the composition of the present invention, was prepared by charging the following to a nitrogen blanketed flask equipped as above:

|  | Parts by Weight |
| --- | --- |
| Portion I | |
| Isopropanol | 29.9 |
| Mineral spirits (Exxsol ® D40 from Exxon) | 35.9 |
| Heptane | 245.6 |
| Acrylic polymer solution | 179.7 |
| (60% solids of an acrylic polymer of 15% styrene, 20% butyl methacrylate, 38.5% ethyl hexyl methacrylate, 22.5% hydroxy ethyl acrylate, 4% acrylic acid, and 1.4% glycidyl methacrylate having a weight average molecular weight of 10,000 in a solvent blend of 77.5% Solvesso ® 150 and 22.5% butanol) | |
| Portion II | |
| t-Butyl peroxy-2-ethyl hexanoate | 0.45 |
| Portion III | |
| Styrene | 35.9 |
| Methyl methacrylate | 194.7 |
| Acrylonitrile | 6.0 |
| Acrylic polymer solution (from above) | 89.9 |
| Hydroxy ethyl acrylate | 29.9 |
| Methyl acrylate | 15.0 |
| Glycidyl methacrylate | 6.0 |

-continued

|  | Parts by Weight |
| --- | --- |
| Acrylic acid | 12.0 |
| Isobutyl alcohol | 26.9 |
| Portion IV | |
| Mineral spirits (Exxsol ® D40 from Exxon) | 21.0 |
| Heptane | 27.0 |
| t-Butyl peroxy-2-ethyl hexanoate | 3.0 |
| Portion V | |
| Isobutyl alcohol | 42.0 |
| t-Butyl peroxy-2-ethyl hexanoate | 1.5 |
| Total | 1002.35 |

Portion I was charged into the reaction vessel and heated to reflux temperature. Portion II was then added to the reaction vessel within 5 minutes before Portions III and IV begin feeding into the reaction vessel. Portions III and IV were separately premixed, and simultaneously fed into the reaction vessel, at reflux temperature, over a 210 minute period. Portion V was premixed and added over a 60 minute period while maintaining reflux temperature. The reaction solution was then held at reflux temperature for 60 minutes. Vacuum was then applied to the reaction vessel, and 236.84 parts by weight solvent are stripped off.

The resulting NAD resin has a weight solids of 60%, a core having a weight average molecular weight of about 100,000-200,000 and arms attached to the core having a weight average molecular weight of about 10,000-15,000.

Preparation of an Acrylic Micorgel Resin

A methyl methacrylate/glycidyl methacrylate copolymer was prepared as an intermediate stabilizing polymer used in the synthesis of the below acrylic microgel resin, also optionally included in the composition of the present invention. This stabilizing polymer was prepared by charging the following to a nitrogen blanketed flask equipped as above:

|  | Parts by Weight |
| --- | --- |
| Portion I | |
| n-Butyl acetate | 195.8 |
| Portion II | |
| Methyl methacrylate | 139.0 |
| n-Butyl acetate | 14.4 |
| Glycidyl methacrylate | 13.1 |
| Glycidyl methacrylate/12-Hydroxystearic acid copolymer (60% by weight solids solution of 89.2% 12-HAS/ 10.8% GMA in a 80/20 blend of toluene and petroleum naphtha) | 181.7 |
| Petroleum Naphtha (Exxsol ® D-3135 from Exxon) | 40.6 |
| n-Butyl acetate | 13.1 |
| Portion III | |
| 2,2'-azobis(2-methylbutyronitrile) | 8.0 |
| n-Butyl acetate | 71.6 |
| Petroleum Naphtha (Exxsol ® D-3135 from Exxon) | 74.3 |
| Portion IV | |
| 4-tert-Butyl catechol | 0.04 |
| n-Butyl acetate | 2.7 |
| Portion V | |
| Methacrylic acid | 2.7 |
| n-Butyl acetate | 6.0 |

-continued

| | Parts by Weight |
|---|---|
| Portion VI | |
| N,N'-dimethyl dodecyl amine | 0.4 |
| n-Butyl acetate | 2.7 |
| Total | 766.14 |

Portion I was charged to the reactor and brought to a temperature of 96 to 100° C. Portions II and III were separately premixed and then added concurrently over a 180 minute period, while maintaining a reaction temperature of 96 to 100° C. The solution was then held for 90 minutes. In sequence, Portions IV, V, and VI were separately premixed and added to the reactor. The reaction solution was then heated to reflux and held until the acid number is 0.5 or less. The resulting polymer solution has a 40% solids content.

The acrylic microgel resin was then prepared by charging the following to a nitrogen blanketed flask equipped as above:

| | Parts by Weight |
|---|---|
| Portion I | |
| Methyl methacrylate | 11.3 |
| Mineral spirits (Exxsol ® D40 from Exxon) | 73.7 |
| Methyl methacrylate/Glycidyl methacrylate stabilizer copolymer (prepared above) | 5.4 |
| Heptane | 60.7 |
| 2,2'-azobis(2-methylbutyronitrile) (Vazo ® 67 from DuPont) | 0.35 |
| Portion II | |
| N,N-dimethylethanolamine | 0.5 |
| Methyl methacrylate | 216.2 |
| Methyl methacrylate/Glycidyl methacrylate stabilizer copolymer (prepared above) | 41.2 |
| Glycidyl methacrylate | 2.1 |
| Methacrylic acid | 2.1 |
| Heptane | 35.8 |
| Mineral Spirits (Exxsol ® D40 from Exxon) | 73.7 |
| Portion III | |
| 2,2'-azobis(2-methylbutyronitrile) (Vazo ® 67 from DuPont) | 0.8 |
| Toluene | 9.7 |
| Heptane | 23.4 |
| Portion IV | |
| n-Butanol | 7.8 |
| Portion V | |
| Hydroxy propyl acrylate | 49.1 |
| Methyl methacrylate/Glycidyl methacrylate stabilizer copolymer (prepared above) | 10.3 |
| Butyl methacrylate | 73.7 |
| Heptane | 11.5 |
| Portion VI | |
| t-Butylperoxy 2-Ethylhexanoate | 9.0 |
| n-Butanol | 43.0 |
| Heptane | 3.9 |
| Total | 765.25 |

Portion I was charged into the reaction vessel, heated to its reflux temperature, and held for 45 minutes. Portions II and III were premixed separately and then added simultaneously over a 120 minute period to the reaction vessel mixed while maintaining the reaction mixture at its reflux temperature. Portion IV was then added. Portions V and VI were premixed separately and then added concurrently to the batch over a 120 minute period while the mixture was maintained at reflux temperature. The mixture was then held at reflux temperature for 30 minutes.

The resulting polymer solution has a weight solids of 50%, and a viscosity of 60 centipoise.

Preparation of Clearcoat Example 1 and Comparative Example 2

Clearcoat compositions were prepared by blending together the following ingredients in the order given:

| INGREDIENTS (all amounts parts by weight) | CLEARCOAT EXAMPLES | |
|---|---|---|
| | Ex. 1 | C. Ex. 2 |
| Fluorinated Acrylosilane Resin (from above) | 614.853 | |
| Non-Fluorinated Acrylosilane Resin (from above) | | 372.575 |
| Acrylic Microgel (from above) | 33.304 | 16.979 |
| Acrylic Polyol Resin (from above) | | 187.030 |
| Acrylic NAD Resin (from above) | | 28.338 |
| Solvesso ® 100 | 114.973 | 194.133 |
| Tinuvin ® 1130[1] (Benzotriazole UV Light Absorber) | 14.286 | 7.028 |
| Tinuvin ® 123[1] (Hindered Amine UV Light Absorber) | 2.968 | 1.460 |
| Tinuvin ® 384[1] (UV Light Absorber) | 12.689 | 6.242 |
| Tinuvin ® 079L[1] (Hindered Amine UV Light Absorber) | 26.531 | 13.052 |
| Disparlon ® LC-955 Surfactant[2] | 6.298 | 5.563 |
| Disparlon ® L-1984 Surfactant[2] | 2.563 | |
| Blocked Acid Catalyst Solution (48.0% DDBSA/10.8% 2-amino methyl propanol/41.2% Methanol) | 21.772 | 17.803 |
| Ethyl 3-ethoxy Propionate | 25.576 | |
| n-Butanol | 2.890 | 2.890 |
| Ethylene Glycol Monobutyl Ether | 38.617 | 38.617 |
| Desmodur ® N-3300[3] Polyisocyanate | 175.845 | 175.845 |
| Phenyl Acid Phosphate | 2.442 | 2.442 |

Sources of above constituents are:
[1] Product of Ciba Specialty Chemical Company
[2] Product of King Industries
[3] Product of Bayer Corporation Phosphated steel panels that had been electrocoated with an electrocoating primer were sprayed and coated respectively with conventional solid black and silver metallic solvent-borne base coating composition to form a basecoat about 0.5 to 1.0 mils thick. The basecoats were each given a flash of 5 minutes. Then the clearcoat paints formulated above were applied "wet-on-wet" over each of the basecoats to form a clearcoat layer about 1.8-2.2 mil thick. The panels were then fully cured by baking for 30 minutes at about 250° F., which is a typical OEM bake. The resulting coated panels were measured for the below properties, and results are tabulated in Table 1.

The following properties of the above coated panels were measured: 20° Gloss, Distinctness of Image (DOI), Hardness measured in Tukon, and advancing and receding water contact angles and advancing and receding hexadecane solvent contact angles as determined by video contact angle system.

The contact angle measurements, in particular, were used to assess the cleanability and dirt retention of the clearcoated surfaces. Contact angles are measured by the Sessile Drop Method which is fully described in A. W. Adamson, The Physical Chemistry of Surfaces, 5th Ed., Wiley & Sons, New York, 1990, Chapter II which is hereby incorporated herein by reference.

Briefly, in the Sessile Drop Method, a drop of liquid, either water or solvent, is placed on a surface and the tangent is precisely determined at the point of contact between the drop and the surface. An advancing angle is determined by increasing the size of the drop of liquid and a receding angle is determined by decreasing the size of the drop of liquid. Additional information on the equipment and procedure needed to measure these contact angles are more fully described in R. H. Dettre, R. E. Johnson Jr., Wettability, Ed. by J. C. Berg, Marcel Dekker, New York, 1993, Chapter 1 which is incorporated herein by reference.

The relationship between water and organic liquid contact angles and cleanability and dirt retention is described in chapters XII and XIII of A. W. Adamson, above. In general, the higher the contact angle the more dirt or soil resistant the surface is and the easier the surface is to clean.

TABLE 1

OEM Initial Coat Test Results

| | | | | | Contact Angles using Video Contact Angle System | | | | | | | |
|---|---|---|---|---|---|---|---|---|---|---|---|---|
| | | | | | Deionized Water | | | | Hexadecane | | | |
| | | | | | Advancing | | Receding | | Advancing | | Receding | |
| Clearcoat | Basecoat | DOI | 20° Gloss | Tukon | Avg. | S.D. | Avg. | S.D. | Avg. | S.D. | Avg. | S.D. |
| Ex. 1 | Silver | 88 | 91 | 13.4 | 102.7 | 0.5 | 91.0 | 0.9 | 45.0 | 0.0 | 43.3 | 1.8 |
| C. Ex. 2 | Silver | 78 | 90 | 12.8 | 90.0 | 0.0 | 72.0 | 1.5 | 10.7 | 1.4 | 6.3 | 0.5 |
| Ex. 1 | Black | 98 | 82 | 12.4 | 103.0 | 0.6 | 88.7 | 1.2 | 45.3 | 0.5 | 42.7 | 0.5 |
| C. Ex. 2 | Black | 97 | 88 | 12.1 | 89.8 | 0.8 | 74.0 | 0.9 | 13.7 | 1.0 | 7.0 | 0.0 |

The above data shows that the clear coating compositions made from fluorinated acrylosilane polymer solutions have a high contact angle for water and for solvents which provides for a finish which is resistant to soiling and is easily washed or wiped clean. The non-fluorinated acrylosilane polymer-containing clearcoat composition, which corresponds to a commercial clearcoat composition, does not exhibit as good as cleanability.

Various modifications, alterations, additions or substitutions of the components of the compositions of this invention will be apparent to those skilled in the art without departing from the spirit and scope of this invention. This invention is not limited by the illustrative embodiments set forth herein, but rather is defined by the following claims.

What is claimed is:

1. A method of applying a coating composition to an automobile or truck body, said coating composition containing about 45-90% by weight of film forming binder and 10-55% by weight of an organic liquid carrier; wherein the binder comprises:

(A) about 10 to 90% by weight, based on the weight of the binder, of a film-forming fluorinated organosilane polymer consisting essentially of about 5 to 98% by weight, based on the weight of the polymer, of polymerized ethylenically unsaturated monomers which do not contain a silane or a fluorine functionality, about 1.5 to 70% by weight, based on the weight of the polymer, of ethylenically unsaturated monomers which contain a silane functionality, and about 0.5-25% by weight, based on the weight of the polymer, of polymerized ethylenically unsaturated monomers which contain a fluorine functionality, (B) about 0 to 60%, based on the weight of the binder, of a non-aqueous dispersed polymer, and (C) about 10 to 90% by weight, based on the weight of the binder, of an crosslinking agent selected from one or both of an organic polyisocyanate and melamine crosslinking agent wherein said method comprises applying said coating composition to an automobile or truck body as a top coat, wherein said topcoat is applied (i) over a basecoat, or (ii) as a clearcoat, wherein said clearcoat is formulated as a one-package system.

2. The method of claim 1 wherein ethylenically unsaturated monomers of said coating composition that contain a fluorine functionality have the following structural formula

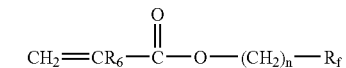

where $R^6$ is selected from the group consisting of hydrogen or an alkyl group having 1-2 carbon atoms, n is an integer of 1-18 and $R_f$ is a fluoroalkyl containing group having at least 4 carbon atoms.

3. The method of claim 1 in which ethylenically unsaturated monomers of said coating composition that contain a silane functionality have the following structural formula

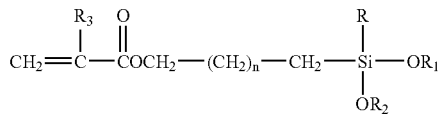

where R is selected from the group consisting of $CH_3$, $CH_3CH_2$, $CH_3O$, or $CH_3CH_2O$; $R_1$ and $R_2$ are independently selected from the group consisting of $CH_3$ or $CH_3CH_2$; and $R_3$ is either H, $CH_3$, or $CH_3CH_2$; and n is 0 or a positive integer from 1 to 10.

4. The method of claim 1 wherein fluorinated organosilane polymer is fluorinated acrylosilane polymer having a weight average molecular weight of about 500-30,000 and consists essentially of ethyenically unsaturated non-silane/non-fluorine containing monomers selected from the group consisting of styrene, alkyl acrylate, alkyl methacrylate, cycloaliphatic acrylates, cycloaliphatic methacrylates, aryl acrylates, aryl methacrylates, and any mixtures thereof, ethylenically unsaturated saline monomers selected from the group consisting of alkoxy silane monomers, acyloxy silane monomers, and any mixtures thereof, end ethylenically unsaturated fluorine monomers selected from the group consisting of fluoroalkyl monomers and perfluoroalkyl monomers and any mixtures thereof, wherein said alkyl, cycloaliphatic, and aryl groups have 1-12 carbon atoms.

5. The method of claim 1 wherein in said coating composition
   (a) polymer comprises polymerized monomers of styrene, alkyl methacrylate, alkyl acrylate or mixtures thereof wherein said alkyl has 1-12 carbon atoms, and an ethylenically unsaturated monocarboxylic acid, and
   (b) macromonomers attached to the core comprise polymerized alkyl methacrylate, alkyl acrylate monomers or mixtures thereof, each having 1-12 carbon atoms in the alkyl group, hydroxy alkyl acrylate or hydroxy alkyl methacrylate or mixtures thereof, each having 1-4 carbon atoms in the alkyl group, and glycidyl acrylate or glycidyl methacrylate.

6. The method of claim 1 wherein the coating composition is a clear coat for a basecoat/clearcoat finish.

7. The method claim 1 wherein said coating composition is a clear coat containing a film forming binder and an organic liquid carrier, wherein the binder comprises a fluorinated silane functional polymer and has a water advancing contact angle at least 100° and a hexadecane advancing angle of at least 40°.

8. A process for coating a substrate, comprising:
   (a) applying a layer of a pigmented basecoating to the substrate to form a basecoat thereon;
   (b) applying to the basecoat a layer of the composition of claim 1 to form a topcoat over said basecoat;
   (c) curing the basecoat and topcoat to form a basecoat and topcoat on the substrate.

9. The method of claim 1 wherein fluorinated organosilane polymer is post added to the coating composition as a polymer or additive.

10. A substrate coated by the method of claim 1.

11. The method of claim 1 applied to an automobile or truck top.

* * * * *